United States Patent
Yin et al.

(10) Patent No.: US 12,333,499 B2
(45) Date of Patent: Jun. 17, 2025

(54) RULES-BASED GENERATION OF TRANSMISSIONS TO CONNECT MEMBERS OF AN ORGANIZATION

(71) Applicant: Oracle International Corporation, Redwood Shores, CA (US)

(72) Inventors: Siu Wan Surlina Yin, London (GB); Ryan Patrick, Seaton (GB)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 18/320,802

(22) Filed: May 19, 2023

(65) Prior Publication Data
US 2023/0289732 A1 Sep. 14, 2023

Related U.S. Application Data

(63) Continuation of application No. 17/038,872, filed on Sep. 30, 2020, now Pat. No. 11,694,163.

(51) Int. Cl.
| | | |
|---|---|---|
| *G06Q 10/105* | (2023.01) | |
| *G06N 3/04* | (2023.01) | |
| *G06N 20/00* | (2019.01) | |
| *G06Q 10/0639* | (2023.01) | |

(52) U.S. Cl.
CPC ............ *G06Q 10/105* (2013.01); *G06N 3/04* (2013.01); *G06N 20/00* (2019.01); *G06Q 10/06393* (2013.01)

(58) Field of Classification Search
None
See application file for complete search history.

(56) References Cited

U.S. PATENT DOCUMENTS

| | | | |
|---|---|---|---|
| 9,536,191 B1 * | 1/2017 | Arel ...................... | G06N 20/00 |
| 9,940,394 B1 * | 4/2018 | Grant .................... | G06F 16/951 |
| 10,148,608 B2 * | 12/2018 | Chatterjee ............. | H04L 67/535 |
| 10,867,269 B2 * | 12/2020 | Grady Smith ....... | G06Q 10/067 |

(Continued)

OTHER PUBLICATIONS

Cunningham, P., Cord, M., Delany, S.J. (2008). Supervised Learning. In: Cord, M., Cunningham, P. (eds) Machine Learning Techniques for Multimedia. Cognitive Technologies. Springer, Berlin, Heidelberg. https://doi.org/10.1007/978-3-540-75171-7_2 ( Year: 2008).*

(Continued)

*Primary Examiner* — Cory W Eskridge
(74) *Attorney, Agent, or Firm* — Invoke

(57) ABSTRACT

One or more embodiments describe techniques for proactively connecting members of an organization together based on detected interest in a particular topic. The system analyzes a profile of a member to detect a particular topic associated with the member, and based on evaluating a set of interactions that another member of the organization had regarding the particular topic, generates an overall connection score for rating a connection between the second member and the particular topic. Responsive to determining that the overall connection score meets a threshold value, the system transmits a communication to generate a connection between the two members, and any other members whose overall connection scores meet the threshold value, for initiating collaboration on the particular topic amongst the various connected members.

20 Claims, 7 Drawing Sheets

(56) References Cited

U.S. PATENT DOCUMENTS

| | | | |
|---|---|---|---|
| 2012/0229446 A1 | 9/2012 | Hyndman et al. | |
| 2013/0275429 A1 | 10/2013 | York et al. | |
| 2016/0132198 A1 | 5/2016 | Sinclair et al. | |
| 2016/0179812 A1 | 6/2016 | Briggs et al. | |
| 2017/0052761 A1* | 2/2017 | Gunshor | G06Q 50/01 |
| 2021/0058264 A1* | 2/2021 | Fahrendorff | H04L 12/1822 |
| 2021/0216937 A1* | 7/2021 | Dhaygude | G06Q 10/06393 |

OTHER PUBLICATIONS

Stewart S, Abidi S Applying Social Network Analysis to Understand the Knowledge Sharing Behaviour of Practitioners in a Clinical Online Discussion Forum J Med Internet Res 2012;14(6):e170 (Year: 2012).

* cited by examiner

| MEMBERS | TOPICS |
|---|---|
| Sarah Smith | Flying Car |
| | Jet Pack |
| | Levitation Boots |
| | Lake Tahoe |
| | Magnetron |
| Darnell Reynolds | Rocket Engine |
| | Lake Tahoe |
| | Flying Car |
| | Perpetual Motion |
| Teresa Ortiz | Magnetron |
| | Rocket Engine |
| | Daycare |
| | Efficient Desalination |
| Sam Patel | Levitation Boots |
| | Flying Car |
| | Efficient Desalination |
| Pat Sullivan | Magnetron |
| | Lake Tahoe |

FIG. 4A

| TOPICS | TOPICS |
|---|---|
| Flying Car | Sam Patel |
| | Darnell Reynolds |
| | Sarah Smith |
| Jet Pack | Sarah Smith |
| Levitation Boots | Sarah Smith |
| | Sam Patel |
| Magnetron | Teresa Ortiz |
| | Sarah Smith |
| | Pat Sullivan |
| Rocket Engine | Teresa Ortiz |
| | Darnell Reynolds |
| Efficient Desalination | Teresa Ortiz |
| | Sam Patel |

FIG. 4B

| INTERACTION TYPE | WEIGHT |
|---|---|
| One-to-One In-Person Meeting | 0.6 |
| In-Person Group Meeting | 0.4 |
| Email Correspondence | 0.2 |
| Telephone Conversation | 0.2 |
| Co-Author of Topic-Specific Paper | 0.8 |
| Sole Author of Topic-Specific Paper | 1.0 |
| Social Media Messaging | 0.1 |
| Direct Messaging | 0.2 |
| Topic-Related Event | 0.5 |

FIG. 5A

| RELEVANCY RANGE | WEIGHT |
|---|---|
| Relevancy (< 1 day) | 1.0 |
| Relevancy (< 1 week) | 0.8 |
| Relevancy (< 1 month) | 0.6 |
| Relevancy (< 1 year) | 0.4 |
| Relevancy (> 1 year) | 0.2 |

FIG. 5B

| CONNECTION FACTOR TYPE | WEIGHT |
|---|---|
| Demonstrated Topic Expertise | 1.0 |
| Relevancy of Topic Interactions | 0.8 |
| Topic-Specific Experience and/or Training | 0.4 |
| Topic-Specific Group Participation | 0.3 |
| Frequency of Topic Interactions | 0.2 |

FIG. 5C

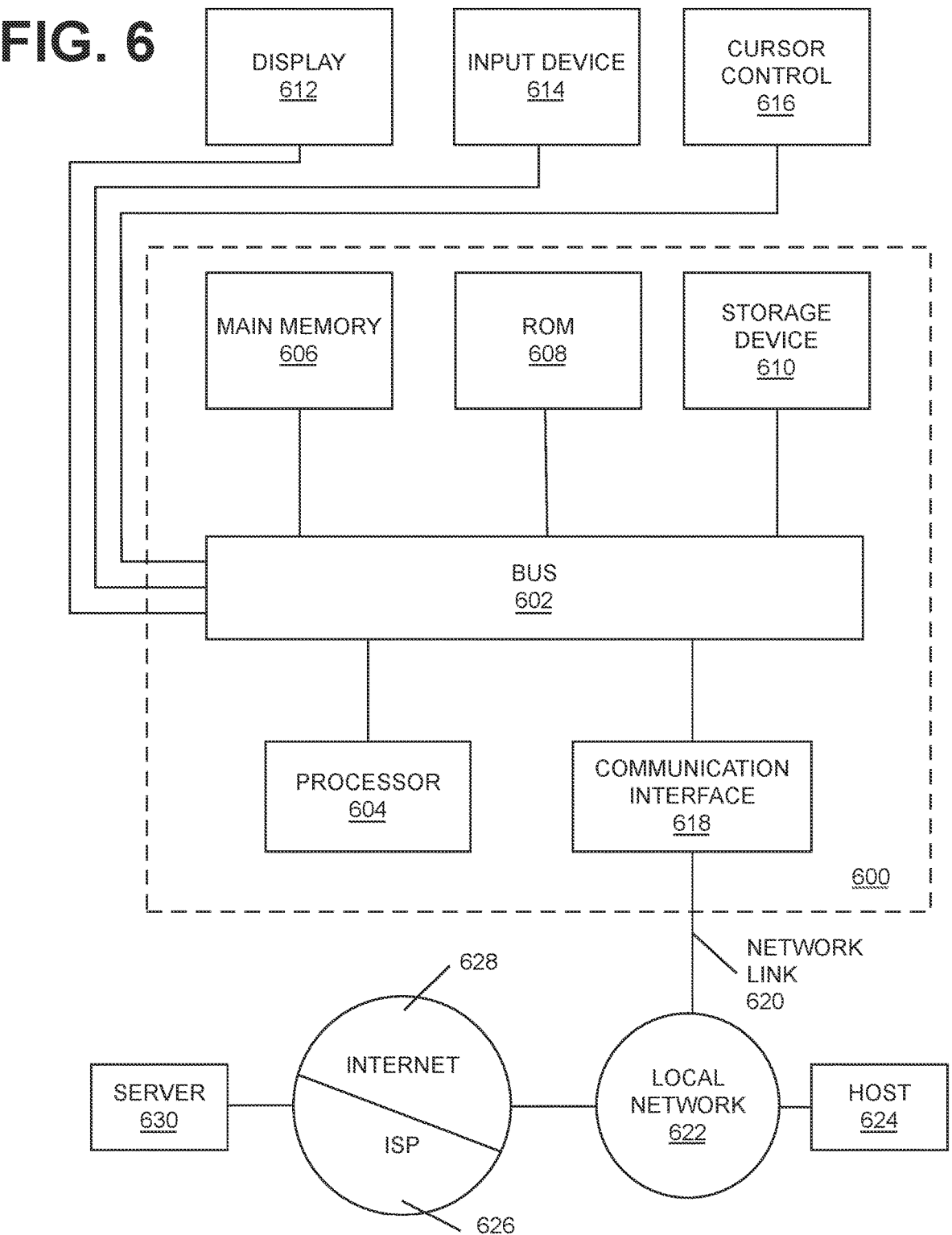

RULES-BASED GENERATION OF TRANSMISSIONS TO CONNECT MEMBERS OF AN ORGANIZATION

INCORPORATION BY REFERENCE; DISCLAIMER

The following application is hereby incorporated by reference: application Ser. No. 17/038,872 filed on Sep. 30, 2020. The Applicant hereby rescinds any disclaimer of claim scope in the parent application(s) or the prosecution history thereof and advises the USPTO that the claims in this application may be broader than any claim in the parent application(s).

TECHNICAL FIELD

The present disclosure relates to rules-based generation of transmissions to connect members of an organization.

BACKGROUND

An organization may include many hundreds or thousands of members, with each member assigned different tasks or functions within the organization. It is difficult to track and analyze what topics each member of the organization is currently assigned, working on, knowledgeable about, or otherwise interested in. Moreover, each member of the organization may have different skill sets that are applicable to different topics. However, any individual member may not be aware of other members in the organization with whom there are shared interests and/or skills.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIGS. 4A-4B are example tables showing correlations between members and topics, in accordance with one or more embodiments;

FIGS. 5A-5C are example tables showing connection factor weights for example connection factors; and FIG. 6 shows a block diagram of an example computing system that may implement the features and processes of FIGS. 1-5C.

Reference symbols in the various drawings that have the same number indicate like elements.

DETAILED DESCRIPTION

Figure 1:
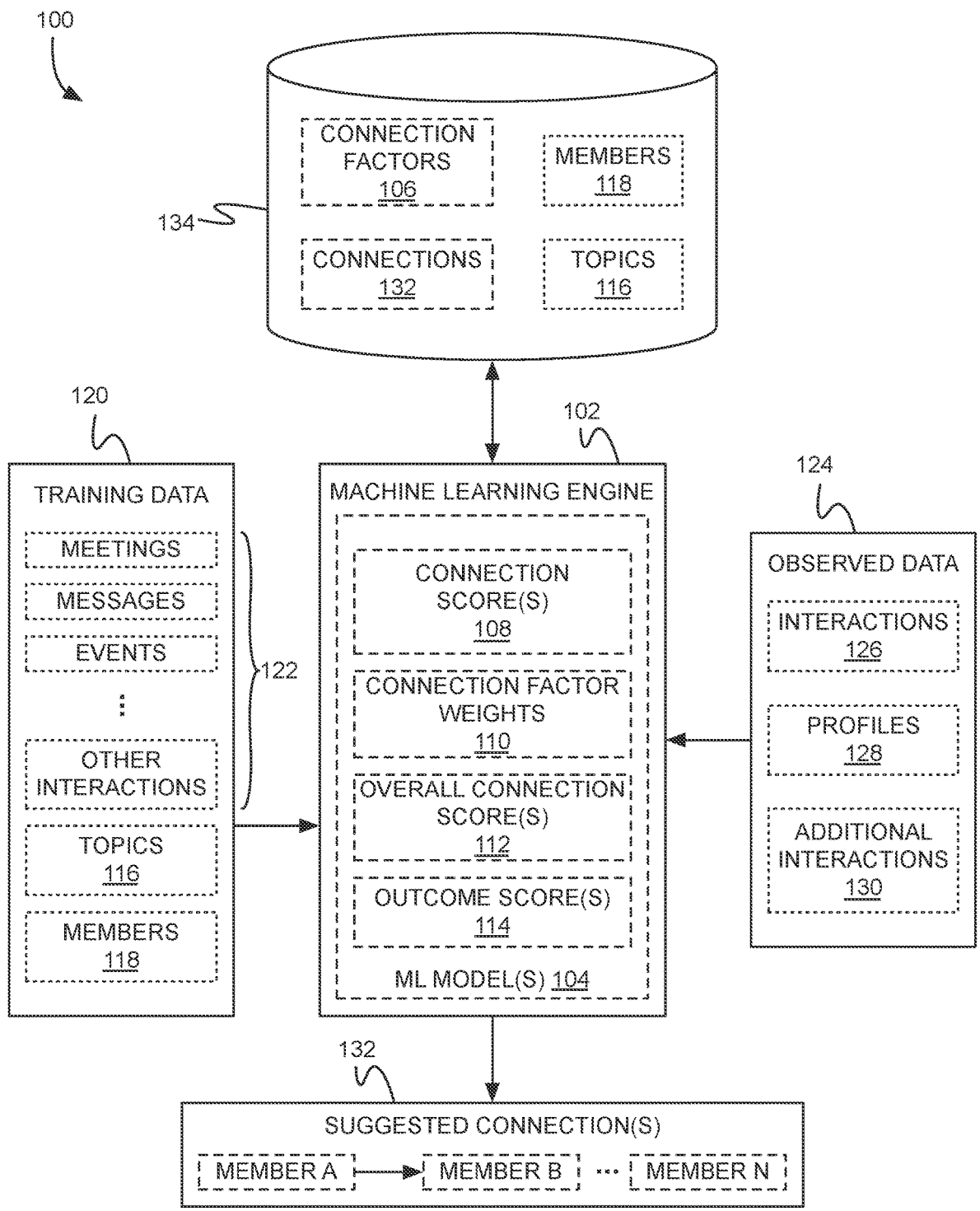
FIG. 1 illustrates a system for proposing connections between members of an organization using a machine learning (ML) model, in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

Details of particular embodiments are provided with respect to the various drawings and the descriptions below. Other enhancements, features, details, and/or advantages of the particular embodiments may be ascertainable by those of skill in the art upon reading the present descriptions and viewing the drawings.

Also, the particular embodiments described herein may be implemented in any computing system environment known in the art, which may include one or more processors and a computer-readable medium configured to store logic, the logic being implemented with and/or executable by the one or more processors to cause the one or more processors to perform operations specified by the logic.

The descriptions presented herein relay sufficient information to enable a person having ordinary skill in the art to make and use the present invention and are provided in the context and requirements of particular embodiments of the present invention.

It is also noted that various modifications to the disclosed embodiments will be readily apparent to a person having ordinary skill in the art and the general principles defined herein may be applied to other embodiments and applications without departing from the spirit and scope of the present invention. Thus, the present invention is not intended to be limited to the embodiments shown and described herein, but is to be accorded the widest scope consistent with the principles and features disclosed herein.

Also, unless otherwise specifically defined herein, all terms are to be given their broadest possible interpretation including meanings implied from the specification as well as meanings understood by a person having ordinary skill in the art and/or as defined in dictionaries, treatises, etc.

Moreover, the term "about" when used herein to modify a value indicates a range that includes the value and less and greater than the value within a reasonable range. In the absence of any other indication, this reasonable range is plus and minus 10% of the value. For example, "about 10 milliseconds" indicates 10 ms±1 ms, such that the range includes all values in a range including 9 ms up to and including 11 ms. In addition, the term "comprise" indicates an inclusive list of those elements specifically described without exclusion of any other elements. For example, "a list comprises red and green" indicates that the list includes, but is not limited to, red and green. Therefore, the list may also include other colors not specifically described.

1. GENERAL OVERVIEW
2. SYSTEM DIAGRAM

3. TRAINING ML MODELS
   3.1 ML MODEL FOR IDENTIFYING INTERACTIONS
   3.2 ML MODEL FOR DETERMINING WEIGHTS
4. PROPOSING CONNECTIONS BETWEEN MEMBERS OF AN ORGANIZATION
5. EXAMPLE EMBODIMENTS
   5.1 TABLES SHOWING MEMBERS CORRELATED WITH TOPICS
   5.2 TABLES SHOWING EXAMPLE CONNECTION FACTOR WEIGHTS
6. COMPUTER NETWORKS AND CLOUD NETWORKS
7. HARDWARE OVERVIEW
8. MISCELLANEOUS; EXTENSIONS

1. General Overview

One or more embodiments apply a set of rules to generate transmissions that connect members of an organization. As an example, the system may generate an introduction email to introduce (a) a member that has been determined to be an expert on a particular topic based on the member's connection with the topic to (b) a member who started on a new project corresponding to the topic.

Initially, the system trains a machine-learning model to recognize a member interactions with a topic based on a set of historical data tagged with interactions. The historical data may include, for example, emails, calendar events, project descriptions, white papers, resumes, search history and conference descriptions with attendees. An interaction tag identify the member and specify the member's interaction type such as working on projects, publishing papers, discussing the topic over email, researching the topic, attending training, and giving trainings. Once trained, the machine-learning model can identify members' interactions by continuously or periodically monitoring documents/activity records corresponding to the members of an organization.

One or more embodiments apply a set of rules to a member's interactions to determine whether the member meets a threshold level of connection with a particular topic. If the member meets the threshold level of connection with the particular topic, the system generates a transmission that connects the member with other member(s) that either (a) also meet the threshold level of connection with the particular topic or (b) are otherwise associated with the topic.

In an example, a rule may determine whether certain interactions regarding a topic should be considered and disregarding interactions which do not satisfy the rule (e.g., emails about a flying car are considered, social media posts about the flying car are not), another rule may determine a weight to apply to each interaction (e.g., 1.0 for an authored paper about flying cars, 0.1 for attending a virtual meeting with hundreds or thousands of other participants about flying cars), and another rule may determine an overall connection score between the member and the topic (e.g., a high score for a member who has many interactions regarding the flying car and is assigned to the flying car project, a lower score for a member who has few interactions about the flying car and is not assigned to work on the flying car project), etc.

Determining a threshold level of connection between a member and a topic may include computing a connection score based on a member's interactions with the topic. The system applies weights to different types of interactions to compute the connection score. A machine learning model may compute/adjust the weights for different types of interactions using a feedback loop. Specifically, the system obtains feedback on members determined to be connected to a topic. The feedback may indicate whether the members, classified by the system as meeting the threshold level of connection to a topic, were found to knowledgeable, helpful, or otherwise useful to other members on matters related to the topic. The machine-learning model identifies a correlation between interaction type and positive feedback to compute/adjust the weights assigned to interaction types for computation of the connection score. A weight assigned to a member's interaction, such as giving a presentation on a topic, may be increased if members with that interaction generally receive positive feedback.

One or more embodiments described in this Specification and/or recited in the claims may not be included in this General Overview section.

2. System Diagram

FIG. 1 illustrates a system 100 for intelligently proposing connections between members of an organization using a ML model, in accordance with one or more embodiments. As illustrated in FIG. 1, system 100 includes a ML engine 102 and a data repository 134.

ML engine 102 is configured to analyze data 124 and propose connections 132 between members 118 of an organization based on observed interactions 126 between various members 118 in the organization.

The organization may be a business, corporation, association, educational institution, governmental agency, a collection of people, or any portion thereof. For example, the organization may be a group of teachers who work at a particular school or within a particular district. In another example, the organization may be a collection of research scientists who belong to the same professional society. In more examples, the organization may be a private company with less than 50 employees, a publicly-traded company having over 50,000 employees, a medium-sized company, or some other type and size of company, corporation, business, or partnership. Any particular collection of people may be grouped together for purposes of belonging to an organization, in the context of the embodiments described herein.

Machine learning includes various techniques in the field of artificial intelligence that deal with computer-implemented, user-independent processes for solving problems that have variable inputs.

In some embodiments, ML engine 102 trains one or more ML models 104 to perform one or more operations. Training a ML model 104 involves using training data to generate a function that, given one or more inputs to the ML model 104, computes a corresponding output. The output may correspond to a prediction based on prior machine learning. In an embodiment, the output includes a label, classification, and/or categorization assigned to the provided input(s). The ML model 104 corresponds to a learned model for performing the desired operation(s) (e.g., labeling, classifying, and/or categorizing inputs). For example, the ML model 104 may be used in determining a likelihood of interactions of a member of an organization indicating a connection to a particular topic.

In an embodiment, ML engine 102 may use supervised learning, semi-supervised learning, unsupervised learning, reinforcement learning, and/or another training method or combination thereof. In supervised learning, labeled training data includes input/output pairs in which each input is labeled with a desired output (e.g., a label, classification, and/or categorization), also referred to as a supervisory signal. In semi-supervised learning, some inputs are associated with supervisory signals and other inputs are not associated with supervisory signals. In unsupervised learning, the training data does not include supervisory signals. Reinforcement learning uses a feedback system in which the ML engine 102 receives positive and/or negative reinforcement in the process of attempting to solve a particular problem (e.g., to optimize performance in a particular scenario, according to one or more predefined performance criteria). In an embodiment, ML engine 102 initially uses supervised learning to train the ML model 104 and then uses unsupervised learning to update the ML model 104 on an ongoing basis.

In an embodiment, ML engine 102 may use many different techniques to label, classify, and/or categorize inputs. ML engine 102 may transform inputs into feature vectors that describe one or more properties ("features") of the inputs. ML engine 102 may label, classify, and/or categorize the inputs based on the feature vectors. Alternatively or additionally, ML engine 102 may use clustering (also referred to as cluster analysis) to identify commonalities in the inputs. ML engine 102 may group (i.e., cluster) the inputs based on those commonalities. ML engine 102 may use hierarchical clustering, k-means clustering, and/or another clustering method or combination thereof. In an embodiment, ML engine 102 includes an artificial neural network. An artificial neural network includes multiple nodes (also referred to as artificial neurons) and edges between nodes. Edges may be associated with corresponding weights that represent the strengths of connections between nodes, which the ML engine 102 adjusts as machine learning proceeds. Alternatively or additionally, ML engine 102 may include a support vector machine. A support vector machine represents inputs as vectors. ML engine 102 may label, classify, and/or categorizes inputs based on the vectors. Alternatively or additionally, ML engine 102 may use a naïve Bayes classifier to label, classify, and/or categorize inputs.

Alternatively or additionally, given a particular input, ML engine 102 may apply a decision tree to predict an output for the given input. Alternatively or additionally, the ML engine 102 may apply fuzzy logic in situations where labeling, classifying, and/or categorizing an input among a fixed set of mutually exclusive options is impossible or impractical. The aforementioned ML model 104 and techniques are discussed for exemplary purposes only and should not be construed as limiting one or more embodiments.

In an embodiment, as the ML engine 102 applies different inputs to a ML model 104, the corresponding outputs are not always accurate. As an example, ML engine 102 may use supervised learning to train the ML model 104. After training the ML model 104, if a subsequent input is identical to an input that was included in labeled training data 120 and the output is identical to the supervisory signal in the training data 120, then output is certain to be accurate. If an input is different from inputs that were included in labeled training data, then the ML engine 102 may generate a corresponding output that is inaccurate or of uncertain accuracy. In addition to producing a particular output for a given input, ML engine 102 may be configured to produce an indicator representing a confidence (or lack thereof) in the accuracy of the output. A confidence indicator may include a numeric score, a Boolean value, and/or any other kind of indicator that corresponds to a confidence (or lack thereof) in the accuracy of the output.

Figure 2A:
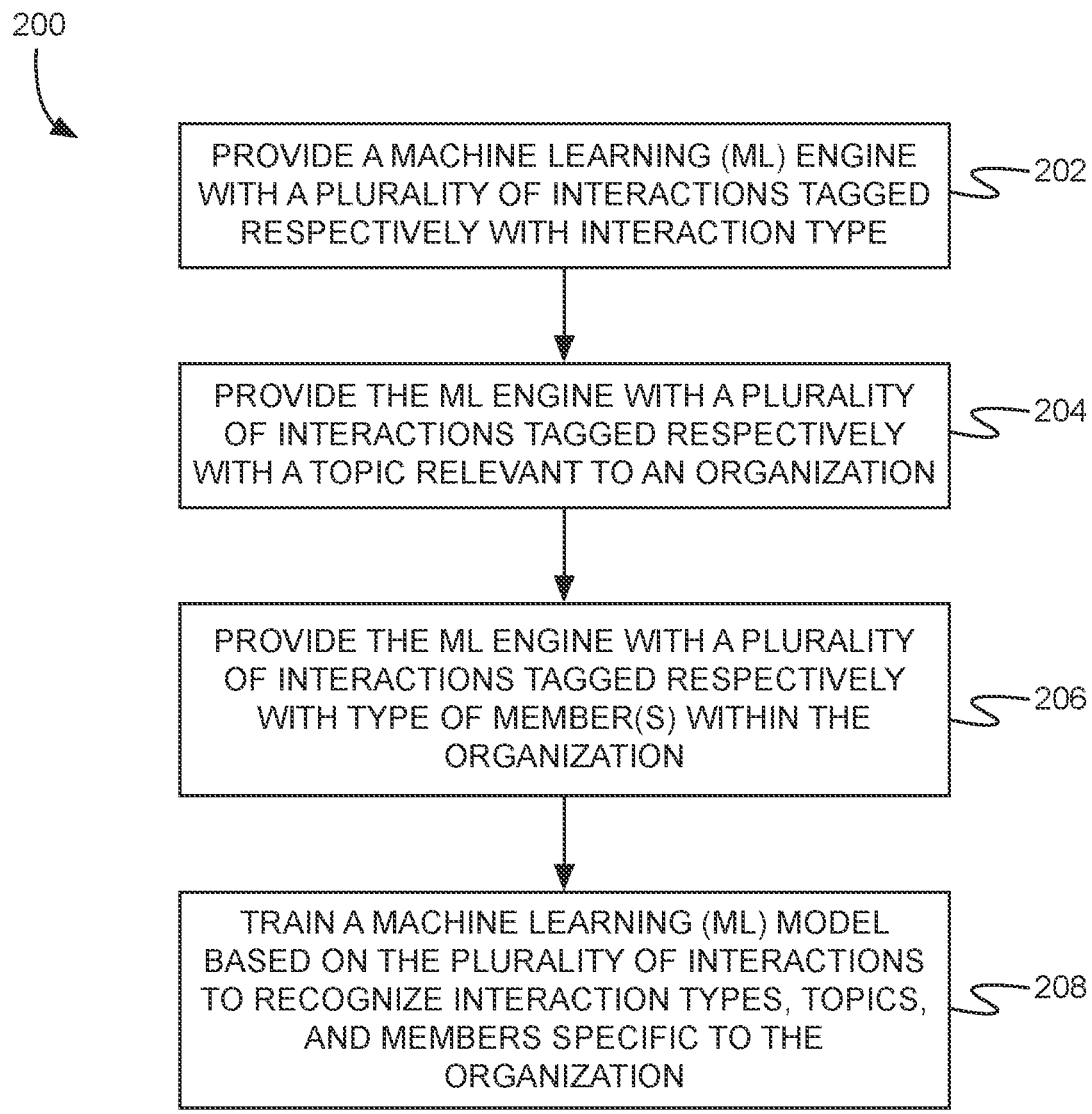
FIG. 2A illustrates an example method for training a ML model to identify interactions between members of an organization, in accordance with one or more embodiments.
Figure 2B:
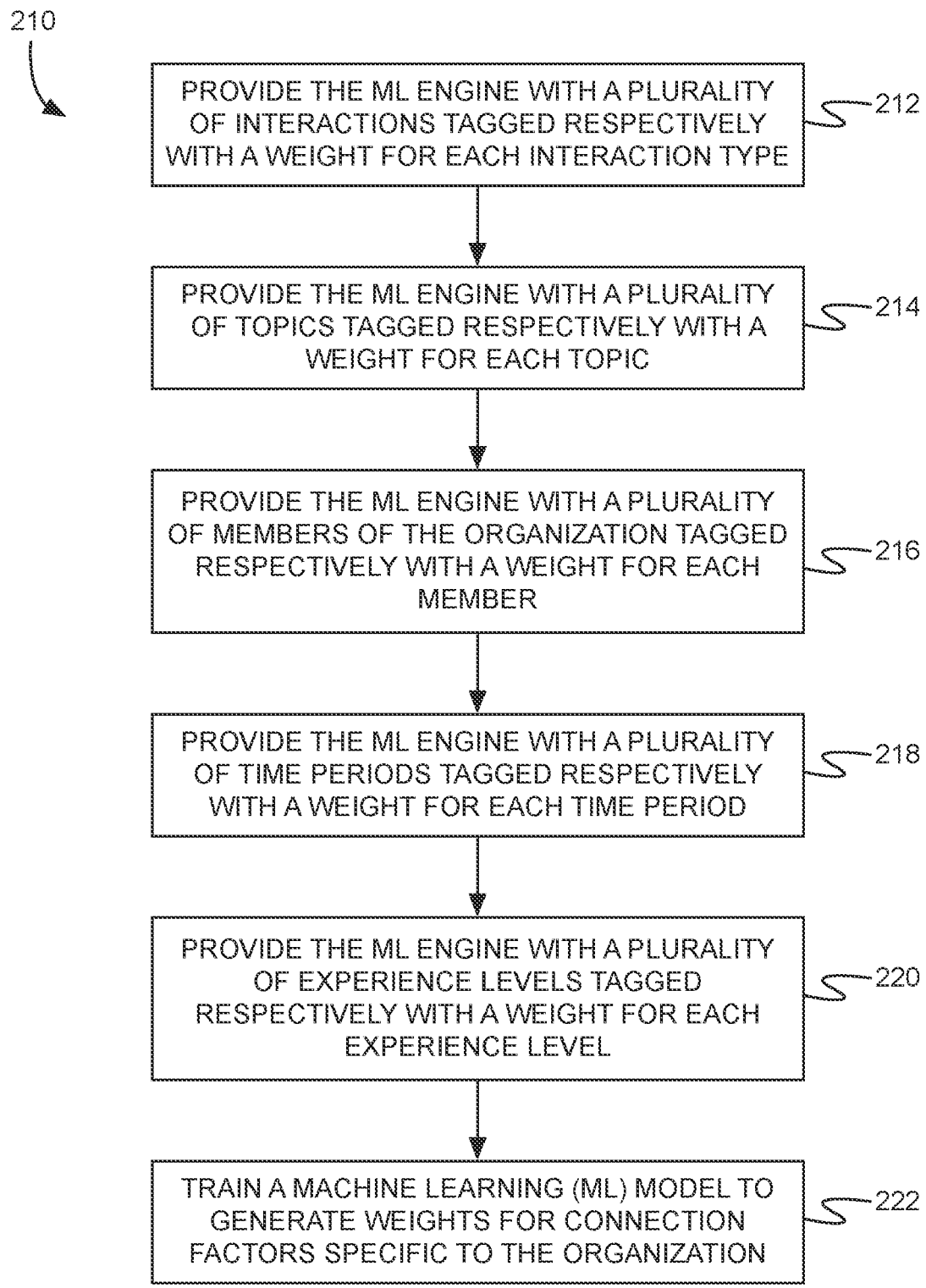
FIG. 2B illustrates an example method for training a ML model to determine weights to assign connection factors, in accordance with one or more embodiments.

ML engine 102 is trained with labeled training data 120, as described in more detail with respect to FIGS. 2A-2B.

Referring again to FIG. 1, ML engine 102 generates the ML model 104 based on analyzing the training data 120. In one or more embodiments, ML engine 102, or some other component of system 100, applies ML model 104 to analyze observed data 124 to generate scores and propose connections between members of the organization, as described in more detail with respect to FIG. 3.

Referring again to FIG. 1, training data 120 may include different types or categories of interactions 122. Example interactions 122 include meetings held virtually or in person by a member, messages sent and/or received by a member, events attended virtually or in person by a member, etc. Information may be provided in training data 120 (e.g., labeling) about each type or category of interactions that are possible for exchanging information at the organization to allow ML engine 102 to learn about these specific interactions 122 to be able to identify data from these various interactions 126 in observed data 124 after generating the ML model 104.

In one or more approaches, training data 120 may include topics 116 that are relevant, important, and/or provided by the organization for monitoring. Topics 116 included in training data 120 may describe different ways of treating specific topics, such as topics to be tracked or monitored, topics to disregard (not track), topics that trigger an alert or message, special topics for which additional information should be obtained, etc. Information may be provided in training data 120 about each topic relevant to the organization to allow ML engine 102 to learn about these specific topics to be able to identify these topics from interactions 126 in observed data 124 after generating the ML model 104.

Training data 120 may include members 118 of the organization, such as specific persons at the organization for which interactions are most relevant for specific topics, and/or a type, role, or category of persons at the organization. Example roles at the organization include CEO, president, board member, accountant, group leader, teacher, expert on a particular topic, unrelated position-holder, regular member, etc. An unrelated position-holder is a general category for individuals at the organization for which interactions are deemed less important than interactions for a regular member of the organization. An expert is a category specific to each topic 116 for individuals at the organization for which interactions are deemed more important for the specific topic than interactions for a regular member of the organization. Information may be provided in training data 120 about each type, role, or category of persons at the organization to allow ML engine 102 to learn about these specific types, roles, or categories to be able to identify the type of member and/or which specific member is involved in interactions 126 in observed data 124 after generating the ML model 104.

Based on the training data 120, ML engine 102 generates the ML model 104, which is configured to provide suggested connections 132 between members 118 of the organization based on observed interactions 126. To provide these suggested connections 132, ML model 104 is configured to generate certain scores upon analyzing observed data 124. ML model 104 is configured to calculate connections cores 108, connection factor weights 110, overall connection scores 112, and outcome scores 114, as described in more detail with respect to FIG. 4.

Referring again to FIG. 1, ML engine 102 is configured to apply ML model 104 to analyze a profile 128 corresponding to a member of the organization. The profile 128 may include details and information about the member. Some example information includes, but is not limited to: name, address, contact details (e.g., phone number, email address, social media identifiers or accounts, etc.), organizational role (e.g., position, title, or category within the leadership structure of the organization, etc.), a length of time in each position held at the organization, project/task(s) information (e.g., past project/task assignments, current project/task assignments, success/failure of completing past projects/tasks, etc.), accolades, awards, recommendations from other members or people outside of the organization, demerits from supervisors or other members, skills, and inclusion in topic-specific committees or groups.

Profiles 128 may be automatically generated by a computing device, in one approach, with automatic and/or manual updates being applied after generation. In an alternate approach, profiles 128 may be manually entered by an administrator for use in identifying and describing members of the organization.

ML engine 102 may analyze the profile 128 of the member to determine background information for the member and which communication channels (telephone, email, social media, direct messaging, etc.) should be monitored to capture interactions of the member. Based on observing interactions 126 and details of the profile 128, one or more particular topics 116, relevant to the organization, may be detected for this member. Past and/or current projects/tasks may influence which topics the member may be involved with, along with analysis of the various interactions 126 that the member has within and outside of the organization, in some instances (depending on security and privacy settings for ML engine 102).

ML engine 102 may calculate connection scores 108 based on a set of connection factors 106. The connection factors 106 may include any parameter, aspect, or characteristic that indicates a connection between a member of the organization and a particular topic. In one embodiment, connection factors 106 and/or connection scores 108 may be stored to a data repository 134 for continued use in connection score 108 calculations and/or analysis by ML model 104 of another member's connection to a topic.

Some example connection factors include, but are not limited to, a demonstrated expertise in the topic, communications with one or more members specifically regarding the topic, how recent any communications regarding the topic have taken place (e.g., recency), an amount of experience or training that a member has in a particular topic, participation or inclusion in a network, committee, or group that relates to the topic, how frequently that a member interacts regarding the particular topic, etc.

For example, ML engine 102 may determine expertise in flying cars based on the member leading meetings for flying cars, being a keynote speaker at a flying car convention, authoring a white paper describing advancements in flying car technologies, receiving grant(s) for flying car research, teaching classes on flying cars, receiving compensation for attending events about flying cars, etc.

In another example, ML engine 102 may determine an amount of experience or training in magnetrons based on a member having attended educational classes devoted to magnetron technology and how many classes or trainings were attended, receiving awards, accolades, and citations for magnetron work product, receiving referrals by other members describing the member's experience in magnetrons, spending a certain amount of time on a committee or project directed to magnetrons, etc.

Each connection factor 106 may be assigned a connection factor weight 110 by ML engine 102 according to a ML model 104 for determining weights. A connection factor weight 110 allows for some connection factors 106 that are more indicative of a connection to a topic to be weighted more heavily in a calculation of an overall connection score 112 between the member and the topic. For example, if the member writes a social media post mentioning how cool a flying car would be, the weight assigned to a connection factor for topic-related writings may be less than if the member writes a technical paper describing flying cars.

In one embodiment, ML engine 102 calculates an overall connection score 112 based on an accumulation of each individual connection scores for the various connection factors. In a further embodiment, ML engine 102 determines a connection factor weight for each connection factor, according to a ML model 104 for determining weights, to calculate the connection score, and sums together each weighted connection score to determine the overall connection score 112. ML engine 102 may store some or all of this information in data repository 134.

Once a connection 132 has been suggested, additional interactions 130 by each member included in the suggested connection 132 may be analyzed to determine the effectiveness of the suggested connection. Based on these additional interactions 130, ML engine 102 may determine an outcome score 114 to rate how effective the suggested connection is to tune the ML model 104 for determining weights and provide better connection suggestions 132 in the future. An outcome score 114 may be calculated similar to an overall connection score, but may rely on additional interactions 130 only when determining connection scores 108 for each connection factor 106.

In one example, a member (Sarah Smith) may be an employee of an organization (Cutting Edge Technologies). Sarah Smith is assigned to a "Flight" group within Cutting Edge Technologies. In Sarah Smith's profile, "Flight" is indicated as her group assignment, with Pat Sullivan indicated as her supervisor, and Sam Patel indicated as a fellow teammate in the "Flight" group. Also, the profile indicates that her email address is Sarah@CuttingEdge.biz, social media identifier is @CETSarah, and telephone number as 850-555-1234.

Based on this profile, ML engine 102 may determine that interactions corresponding to Sarah Smith should include: (1) all email correspondence directed to and received from Sarah@CuttingEdge.biz, (2) all social media posts, tags, likes, and interactions directed to and received from @CETSarah, and (3) all phone calls directed to and received from 850-555-1234. Moreover, ML engine 102 may determine based on the profile that Sarah Smith is proficient in Flight-based technologies, such as projects "Flying Car" and "Jet Pack" that are currently being developed at Cutting Edge Technologies.

In this example, assume that ML engine 102 observes interactions corresponding to Sarah Smith that include the following topics: flying car, jet pack, levitation boots, Lake Tahoe, and magnetron. Continuing with this example, ML engine 102 may disregard Lake Tahoe as a topic relevant to Cutting Edge Technologies. In an example, Lake Tahoe may be disregarded as a topic because it is designated or marked as a topic to disregard. In another example, Lake Tahoe may be disregarded as a topic based on a determination that no projects/tasks are related to this location on the California/Nevada border, e.g., no facilities, installations, customers, or users of Cutting Edge Technologies are present in or around Lake Tahoe.

The other topics (flying car, jet pack, levitation boots, and magnetron) may be considered to be topics relevant to Cutting Edge Technologies. ML engine 102 will apply ML model 104 to analyze interactions 126 in observed data 124 to determine which members 118 of Cutting Edge Technologies, including Sarah Smith, discuss or are otherwise related to these topics 116, and whether one or more connections 132 should be suggested between any of the members and Sarah Smith, with the related topic being indicated in the suggested connection 132 (e.g., flying car, jet pack, levitation boots, or magnetron).

In one or more embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

In one or more embodiments, an interface may refer to hardware and/or software configured to facilitate communications between a user and a computing device. An interface renders user interface elements and receives input via user interface elements. Examples of an interface include a graphical user interface (GUI), a command line interface (CLI), a haptic interface, and a voice command interface. Examples of user interface elements include checkboxes, radio buttons, dropdown lists, list boxes, buttons, toggles, text fields, date and time selectors, command lines, sliders, pages, and forms.

In an embodiment, different components of an interface are specified in different languages. The behavior of user interface elements is specified in a dynamic programming language, such as JavaScript. The content of user interface elements may be specified in a markup language, such as hypertext markup language (HTML) or XML User Interface Language (XUL). The layout of user interface elements is specified in a style sheet language, such as Cascading Style Sheets (CSS). Alternatively, an interface may be specified in one or more other languages, such as Java, C, or C++.

In one or more embodiments, data repository 134 may be any type of storage unit and/or device (e.g., a file system, database, collection of tables, or any other storage mechanism) for storing data. Further, data repository 134 may include multiple different storage units and/or devices. The multiple different storage units and/or devices may or may not be of the same type or located at the same physical site. Further, data repository 134 may be implemented or may execute on the same computing system as ML engine 102. Alternatively or additionally, data repository 134 may be implemented or executed on a computing system separate from ML engine 102. Data repository 134 may be communicatively coupled to ML engine 102 via a direct connection or via a network.

Additional embodiments and/or examples relating to computer networks which may be used to receive and/or transmit information for system 100 are described below in Section 6, titled "Computer Networks and Cloud Networks."

In an embodiment, system 100 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

3. Training Ml Models 3.1 ML Model for Identifying Interactions

FIG. 2A illustrates an example method 200 for training a ML model to identify interactions between members of an organization, in accordance with one or more embodiments. One or more operations illustrated in FIG. 2A may be modified, rearranged, or omitted all together. Accordingly, the particular sequence of operations illustrated in FIG. 2A should not be construed as limiting the scope of one or more embodiments.

Method 200 may be performed by any suitable component of system 100 in FIG. 1, such as ML engine 102, or any other computing device. For the remainder of the descriptions of FIG. 2A, method 200 will be described as being performed by a computing device.

In operation 202, the computing device provides a ML engine with a set of interactions. Each interaction is tagged with an interaction type (e.g., email, phone call, social media communication, direct message, etc.). Based on these tagged interactions, the ML engine produces a ML model that can recognize such interactions from observed data. Each interaction type that may be used by members of the organization are input to the ML engine to train the ML model, in one embodiment. In another embodiment, the ML engine is trained on interaction types that are most commonly used by members of the organization to discuss relevant topics to the organization, and based on these most common interaction types, the ML model may learn other less common interaction types.

In operation 204, the computing device provides the ML engine with a plurality of sets of topic-specific interactions. Each set of topic-specific interactions is tagged with the particular topic that is discussed by interactions in the set. Moreover, each topic that the ML engine is trained on is relevant to the organization. These relevant topics may be stored in a data repository. In a further approach, the ML engine may also be trained to recognize non-relevant topics so that it may disregard interactions that include such non-relevant topics.

In an alternate approach, the ML engine may be trained on specific relevant topics (e.g., provided in a list or database) instead of from interactions. In either approach, the ML model is trained to recognize relevant topics (and in some cases non-relevant topics) from observed interactions.

In an example, the ML engine may be trained with topic metadata both internal to the organization and external to the organization to identify relevant topics. For example, internal metadata may be gleaned from emails, direct messages, social media posts, meeting invitations, calendared events, documentation libraries, blogs, etc. External metadata, for example, may include trends, popularity, movements, local/regional/global influences, sector and industry news, market data and news, company reports, etc.

In operation 206, the computing device provides the ML engine with a set of interactions tagged individually with one or more members of the organization that are involved in the interactions. In an alternate approach, the ML engine may be trained on members of the organization (e.g., provided in a list or database) instead of from interactions. In either approach, the ML model is trained to recognize specific members of the organization, position or title of the members, and importance of interactions for specific members from observed interactions.

In another embodiment, the computing device provides the ML engine with profiles for each member. A profile may include information and details about the member that may otherwise be unavailable to the ML engine from regular interactions of each member for training purposes. Some example information includes mental state, ideology, personal beliefs, values, attitudes, behavior, strengths, weaknesses, capabilities, skills, other members in the member's network or certain degrees of separation, social leadership, reputation, feedback, etc.

This information may be analyzed to determine if the member is an effective leader, accomplishes assigned tasks, follows through on projects, etc. Each of these traits may be used to weight how important a member's involvement in a particular topic is in comparison with other members.

In operation 208, the computing device (e.g., ML engine) trains the ML model based on the various sets of interactions provided in operations 202, 204, and 206, to recognize interaction types, topics relevant to the organization, and members specific to the organization. The ML model is able to recognize these elements by monitoring, tracking, and/or receiving interactions of members of the organization (e.g., observed interactions). The longer the ML model observes interactions, the more it can refine its ability to predict connections between members that would be beneficial to sharing knowledge concerning relevant topics.

3.2 ML Model for Determining Weights

FIG. 2B illustrates an example method 210 for training a ML model to determine weights to assign connection factors, in accordance with one or more embodiments. One or more operations illustrated in FIG. 2B may be modified, rearranged, or omitted all together. Accordingly, the particular sequence of operations illustrated in FIG. 2B should not be construed as limiting the scope of one or more embodiments.

Method 210 may be performed by any suitable component of system 100 in FIG. 1, such as ML engine 102, or any other computing device. For the remainder of the descriptions of FIG. 2B, method 210 will be described as being performed by a computing device.

In operation 212, the computing device provides the ML engine with a plurality of different interaction types. Each interaction type is tagged with information that aids in determining a weight to assign to the different interaction types. Example information includes a particular weight assignment for the interaction type, an importance or priority of the interaction type, a binary indicator (0/1) of whether the interaction type should be considered to determine a connection between a member and a topic, etc.

For example, if email communications are considered to be more relevant than social media posts, then the email communication type is tagged with a higher weight or indication of importance than the social media post type. In another example, in person meetings may be tagged with a priority of 1 (a highest priority rating) while attending a virtual meeting on a topic is tagged with a priority of 9 (a much lower priority rating).

In a further embodiment, the computing device may be trained on different types of interactions in relation to how impactful an interaction type is relative to other interaction types for predicting a connection between a member and a topic. Based on this training, the computing device may generate and maintain weights for each different interaction type which adjust the effect that the interaction type has on an overall connection score.

For example, a publication about flying cars is read by 5000, a seminar about flying cars is attended by 1000 people, 50 people have published a paper on flying cars, 10 people have held tutorials on flying cars, and 5 people won awards for flying cars, the computing device can generate weight factors for each of these different interaction types, such that winning an award is weighted highest (e.g., 1.0), teaching a class is weighted next highest (e.g., 0.8), writing a paper is weighted next highest (e.g., 0.5), attending a seminar is weighted next highest (e.g., 0.2), and reading a publication is weighted lowest (e.g., 0.1).

In another example, each industry and/or organization may have a structure in place for how particular interaction types should be measured against one another, and the weights may be assigned based on the industry or organization standard.

In operation 214, the computing device provides the ML engine with a plurality of topics. Each topic is tagged with information that aids in determining a weight to assign to the different topics when identified in interactions between members of the organization and used to determine whether the topic is relevant to the organization.

Example information that topics may be tagged with includes a particular weight assignment for each respective topic, an importance, relevancy, or priority of the topic, a binary indicator (0/1) of whether the topic is relevant to the organization (and monitored for connections with members) or not relevant (and disregarded), etc.

In operation 216, the computing device provides the ML engine with a plurality of members of the organization. Each member's identity is tagged with information that aids in determining a weight to assign to the different members when identified as a party to an interaction. These weights may be used to determine a connection of another member with a topic. Interactions of more important members may carry greater weight when discussing a topic than interactions with less important members.

Example information that members' identities may be tagged with includes a weight assignment for each respective member, an importance, seniority, or hierarchical standing of the member, a binary indicator (0/1) of whether the member's interactions should be considered for connections to a topic, etc.

In operation 218, the computing device provides the ML engine with a plurality of time periods. Each time period is tagged with information that aids in determining a weight to assign to the different time periods as they relate to recency of interactions between members of the organization. More recent interactions may be considered more relevant than older interactions, and therefore may be assigned greater weight when determining a connection between a member and a topic.

Example information that time periods may be tagged with includes a weight assignment for each respective time period, a range of weights that may be assigned to each time period, a binary indicator (0/1) of whether the time period precludes an associated interaction from being considered to determine a connection with a topic, etc.

In operation 220, the computing device provides the ML engine with a plurality of experience levels. Each experience level is tagged with information that aids in determining a weight to assign to the different experience levels. Each member of the organization may have a certain experience level assigned for one or more topics that the member has been associated with, which may be stored in the member's profile.

These weights may be used to determine a connection between another member and a topic. Interactions with a member having a greater experience level in a particular topic may be assigned greater weight as compared to interactions with a member having less experience in the particular topic.

Example information that different experience levels may be tagged with includes a weight assignment for each respective experience level, a range of weights that may be assigned to each experience level, a binary indicator (0/1) of whether the experience level precludes an associated interaction from being considered to determine a connection with a topic (e.g., too little experience in the topic), etc.

In operation 222, the computing device trains a ML model to generate weights for various different connection factors specific to the organization. Example connection factors that are described in FIG. 2B include interaction type, topic(s) included in the interaction, member(s) involved in the interaction, recency of the interaction, experience level of the member involved in the interaction. However, more or less connection factors than those specifically described in FIG. 2B may be used in determining a connection between a member and a topic, and between In one or more embodiments, a non-transitory computer readable medium may store instructions, that when executed by a hardware processor, cause execution of one or more operations of method 210. According to one or more embodiments, a system may include the non-transitory computer readable medium and the hardware processor.

4. Proposing Connections Between Members of an Organization

Figure 3:
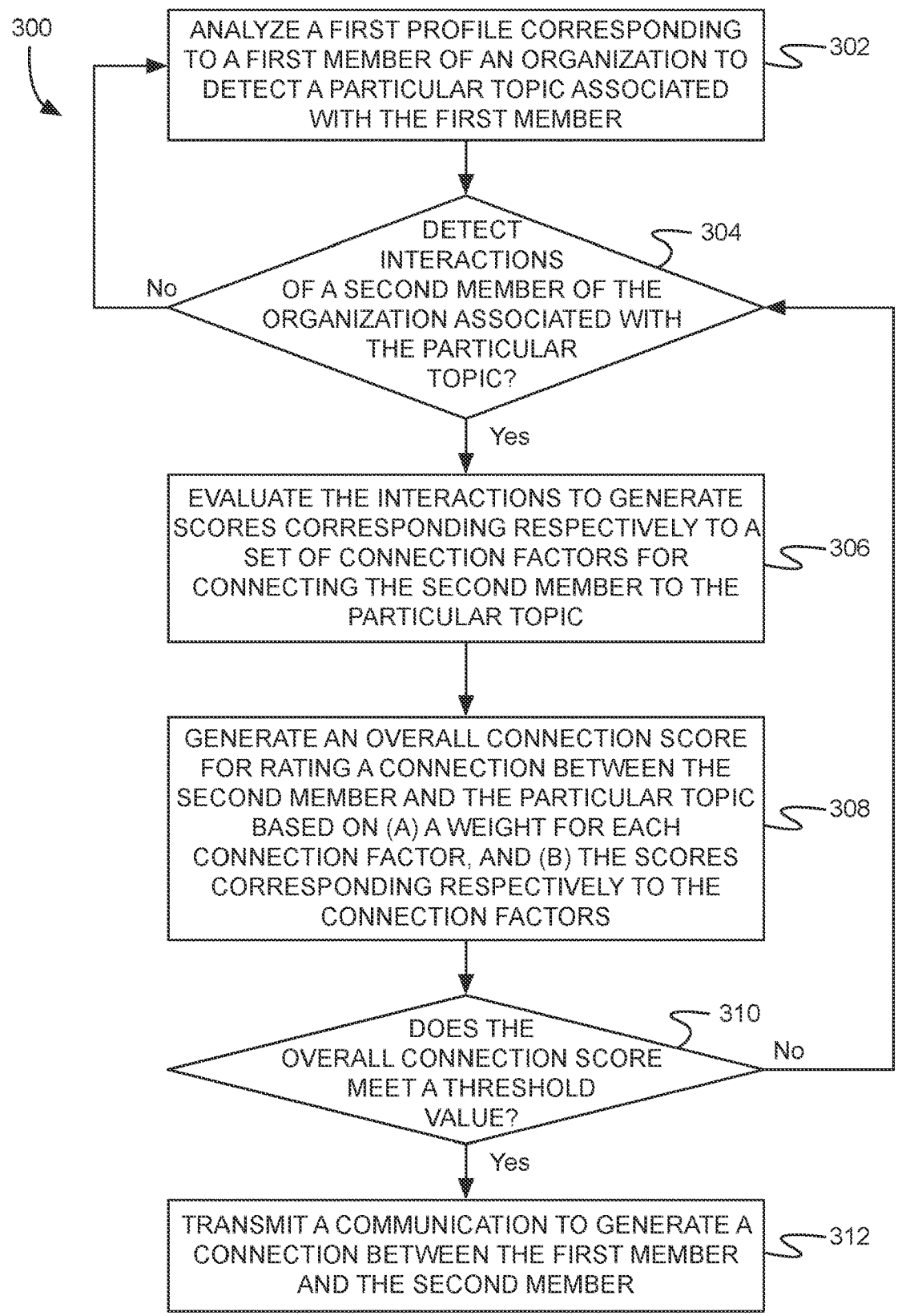
FIG. 3 illustrates an example method for proposing connections between members of an organization using a ML model, in accordance with one or more embodiments.

FIG. 3 illustrates an example method for proposing connections between members of an organization using the ML model, in accordance with one or more embodiments. One or more operations illustrated in FIG. 3 may be modified, rearranged, or omitted all together. Accordingly, the particular sequence of operations illustrated in FIG. 3 should not be construed as limiting the scope of one or more embodiments.

Method 300 may be performed by any suitable component of system 100 in FIG. 1, such as ML engine 102, or any other computing device. For the remainder of the descriptions of FIG. 3, method 300 will be described as being performed by a computing device.

In operation 302, the computing device the computing device analyzes a first profile, corresponding to a first member of an organization, to detect a particular topic associated with the first member. An associated topic is any topic that has been discussed, researched, or taught by the first member. The organization may generate profiles for each member of the organization in order to store information useful in identifying the members and tracking accomplishments, tasks, teams, etc., to which the member has been involved while with the organization.

In one or more embodiments, the first profile may include information and details about the first member and the member's involvement with the organization. Some example profile information includes, but is not limited to: name, address, contact details (e.g., phone number, email address, social media identifiers or accounts, etc.), organizational role (e.g., position, title, or category within the leadership structure of the organization, etc.), a length of time in each position held at the organization, project/task(s) information (e.g., past project/task assignments, current project/task assignments, success/failure of completing past projects/tasks, etc.), accolades, awards, recommendations from other members or people outside of the organization, demerits from supervisors or other members, skills, and inclusion in topic-specific committees or groups.

In one embodiment, a member profile may indicate a desired or most frequently used communication type or channel (e.g., email, phone, direct messaging, etc.). This allows the computing device to determine which interactions are most likely to reveal topics that the member is actively involved in with the organization.

For example, the first profile may indicate the first member's name, identify that the first member is part of a group working on a flying car, and include the first member's email address and social media identifier for direct messaging. Based on this profile information, the computing device may determine that "flying car" is a topic correlated to the first member.

In operation 304, the computing device detects a plurality of interactions, of a second member of the organization, associated with the particular topic. Any type of interactions may be detected and used in method 300. Some example interactions include, but are not limited to, projects, emails, meetings, networking events, telephone conversations, smart speaker inquiries, direct messaging, social media posts and reactions, public speaking on a topic, trainings and/or sessions on a topic, etc. The particular topic may be detected by application of rules stored in an ML model trained to identify interaction types, members, and topics relevant to the organization. For example, a rue may perform a word search through all interactions to find each instance of the words "flying car" to determine which interactions are related to the topic "flying car."

If no further interactions associated with the particular topic are detected, method 300 returns to operation 302 to determine a different topic that the first member is associated with to continue with the method.

In one or more embodiments, the interactions may be detected from communication channels provided by, related to, and/or managed by the organization, such as an email server, local area network (LAN), virtual private network (VPN), organization-provided computing device (laptop, smartphone, tablet, etc.), internal direct messaging application, etc.

In operation 306, the computing device evaluates the plurality of interactions to generate a plurality of scores corresponding respectively to a plurality of connection factors for connecting the second member to the particular topic. This evaluation may comprise application of rules configured to provide a quantitative measure to compare how involved the second member is with the particular topic. The scores may be generated by application of rules stored in an ML model trained to identify and rate connection factors. In one example, a rule may determine if a connection factor has been satisfied or applies to a certain topic, and calculates 0 for a connection factor which does not apply and 1 for a connection factor which is satisfied by the interaction of the member. According to another example, a rule may determine a degree that a member's interaction satisfies a connection factor (e.g., a score of 10 for an authored paper directly about a flying car, a score of 5 for a series of emails that are exchanged with a supervisor about the flying car, and a score of 1 for a single direct message about flying cars with a co-worker).

In an approach, a score for a particular connection factor may be calculated on a binary basis, e.g., does the interaction satisfy a connection factor or not (0/1). The particular connection factor may then be modified by a weight and added to all other weighted connection factor scores in calculating the overall connection score.

In one or more embodiments, the connection factors describe parameters, aspects, or characteristics that indicate a connection between the second member of the organization and the particular topic.

Some example connection factors include, but are not limited to, a demonstrated expertise in the topic, communications with one or more members specifically regarding the topic, how recent any communications regarding the topic have taken place (e.g., recency), an amount of experience or training that a member has in a particular topic, participation or inclusion in a network, committee, or group that relates to the topic, etc.

In one embodiment, a connection score for a particular connection factor may be a binary score (e.g., 0 or 1), indicating existence or lack of a particular connection factor. For example, if a connection factor rates participation in a topic-related group and the second member is part of a group working on the particular topic, then the connection score for this connection factor may be 1. If the second member is not part of the group working on the particular topic, the connection score for this connection factor may be 0.

In another embodiment, a connection score for a particular connection factor may be a range of scores (e.g., 0 to 1, 0 to 100, etc.), indicating existence or lack of a particular connection factor along with how extensively the second member fulfills the particular connection factor. For example, if a connection factor rates whether the second member works on the particular topic, and the second member has worked on the particular topic for 6 years (with ten years being a threshold for expertise on the particular topic), then the connection score for this connection factor may be 0.6 on a 0-1 scale. If the second member has not worked on the particular topic for any length of time, the connection score for this connection factor may be 0 (for any scale that includes 0 as the minimum score).

In operation 308, the computing device generates an overall connection score for rating a connection between the second member and the particular topic. The overall connection score is based on the plurality of scores corresponding respectively to the plurality of connection factors. For example, the plurality of scores may be added together to determine the overall connection score, with either a larger or smaller overall connection score (depending on whether individual connection scores are larger or smaller when the associated connection factor is present for the second member) being indicative of a connection between the second member and the particular topic.

In a further approach, each connection factor may be assigned a connection factor weight by the computing device (e.g., ML engine) according to a trained ML model. A connection factor weight allows for some or all of the connection factors to be weighted in the overall connection score calculation, e.g., each connection score is multiplied by an assigned connection factor weight, then summed to calculate the overall connection score. A default weight of 1 may be assigned to each connection factor, and this value may be adjusted over time, as the computing device learns which connection factors are most indicative of a connection with the topic (and thus assigned an increased weight closer to 1), and which are less indicative of a connection (and thus assigned a reduced weight closer to 0).

For example, if the connection factor measures the second member's writings about the particular topic, and the second member writes a social media post mentioning a flying car, the connection factor for this interaction may be weighted to effect the overall connection score less than if the second member writes a paper describing flying cars.

In another example, if attending classes related to the particular topic is a connection factor, and over time the computing device recognizes that there is little or no correlation between classes that members have attended and connections with topics of those classes, the weight for this connection factor may be reduced (closer to 0) when calculating the overall connection score.

In this further approach, the overall connection score may be based on: (a) a weight associated with each connection factor of the plurality of connection factors, and (b) the plurality of scores corresponding respectively to the plurality of connection factors.

According to an embodiment, the ML model may provide, generate, and/or assign different connection factor weights for different types of connections. As an example, interactions, such as presentations and/or tutorials, may be weighted higher than other interactions for finding an expert for serving as an advisor for a new project. Interactions, such as projects and/or coding, may be weighted higher than other interactions for finding a co-worker and/or engineer to add as a peer to a new project.

In operation 310, the computing device determines whether the overall connection score meets a threshold value. The threshold value may be user set or automatically generated based on past or historical performance of other threshold settings.

According to one embodiment, the overall connection score may be normalized to a predetermined scale (e.g., −1 to +1, 0-1, 0-10, 0-100, etc.). In this way, a threshold may be set that falls within the range to filter out overall connection scores which do not indicate a connection between the second member and the first member.

In operation 312, the computing device transmits a communication to generate a connection between the first member and the second member for collaboration about the particular topic. This communication is generated and transmitted responsive to the overall connection score meeting the threshold value.

If the overall connection score does not meet the threshold value, e.g., it is less than the threshold value when the threshold value indicates a value to be equaled or exceeded by the overall connection score, method 300 returns to operation 304 to search for interactions from another member of the organization associated with the particular topic, having determined that the second member is not connected to the particular topic. When all interactions have been analyzed, method 300 may move on to a second topic to determine if possible connections exist between other members and the second topic for connecting one or more other members to the first member for the second topic.

In one embodiment, the communication may include a user interface (UI) element that is selectable by the receiving member to indicate that a member would like to proceed with the connection to the other member(s). The computing device may detect when such a UI element is selected in order to formally establish the connection with a message between the members introducing one another, and proposing a meeting time populated on each member's calendar when they are free to meet.

The communication may, in one approach, nominate a leader for the connection based on seniority of the members connected together, expertise on the topic, or some other criteria learned by the computing device as being effective at establishing and nurturing these connections. The leader may be determined based on semantic parsing to measure Eisenhower's Urgent/Important Principle, then base the decision of who the leader should be based on: availability of the members, responsibility and accountability of the members, roles of the members within the organization, stimulating cognitive diversity (reducing groupthink and increasing demographic, personality, and characteristic-based diversity within the connected members).

The communication may also invite other established groups which are already collaborating on the particular topic to join into a unified meeting of all selected members in an embodiment.

The computing device may determine what type of communication should be used to transmit the communication (e.g., email, phone call, direct message, etc.). This determination may be based on what type of communication has been positively received historically. For example, a certain member may not respond to email effectively. In this example, the computing device would not transmit the communication using an email channel, and instead would utilize direct messaging, a phone call, etc.

The communication, in one or more embodiments, may automatically suggest meeting time(s), initial agenda items, meeting objectives, and meeting take-aways. Other typical meeting parameters may also be automatically selected, such as meeting duration, meeting location, meeting start time, etc., based on evaluation of members' calendars and roles within the organization.

According to one approach, a virtual meeting room may be established with multiple interfaces for each member determined to be associated with a particular topic. Collateral information relevant to the topic may be provided within the virtual meeting room, such as hyperlinks, documents, reference materials, etc. The virtual meeting room, in an approach, may include an agenda with a timer for each subject in the agenda to maintain a cadence in moving the meeting along. The virtual meeting room may produce a transcription of the meeting notes in which each participant has the ability to edit the meeting notes as desired for completeness and accuracy. The ML model may measure effectiveness of the proposed connection based on this initial meeting once the meeting is complete. The ML model may also provide additional services for the virtual meeting, such as produce a task list and predicted time to resolve the various tasks, assign members to perform individual tasks, list critical paths to accomplish tasks, provide further meeting(s) outlook, schedule a follow-up or regular meeting, etc.

Once the computing device transmits a communication to generate a connection between the first member and the second member, additional interactions by one or more of the members who received the communication may be analyzed to determine the effectiveness of the connection. These interactions may take place during collaboration about the particular topic or for other reasons unrelated to the particular topic. The additional interactions may be analyzed by the computing device (e.g., the ML engine), using the ML model, to determine whether the connection was successful in matching together members who share an interest in the particular topic.

In one approach, based on these additional interactions, the computing device may determine an outcome score to rate effectiveness of the connection between the members. The outcome score may be used to tune the ML model and provide better connections in the future. The outcome score may be calculated similar to an overall connection score, but may rely on the additional interactions when determining connection scores for each connection factor.

Once the outcome score is computed for the additional interactions, the computing device updates one or more of the weights of one or more connection factors based on the outcome score. In this way, the computing device generates an updated set of weights for the connection factors that will be used for analyzing whether to transmit each subsequent connection.

According to one embodiment, the outcome score may be based on a business value of the connection between the first member and the second member. In one or more embodiments, the business value may be determined based on several business value factors. For example, one business value factor may be the number of business functions (e.g., meetings, documentation webpages, presentations, trainings, etc.) that are held regarding a topic. Business functions are indicative of the topic's business value. The more business functions devoted to a topic, the greater the topic's business value relative to other topics.

In another example, linguistic clustering may be used to identify topics, with validity and business value of the topic being determined later. In one example, a topic may be validated as having high business value through external sources, e.g., Internet-based documentation, articles in journals, news stories about a topic, etc.

In an embodiment, business value of the connection may be determined based on the position or role of the first and second members in the organization in an approach. For example, connections that include low-level members may not be rated with as high of a business value as connections that include one or more high-level members (e.g., senior persons, experts, CEO, presidents, vice presidents, etc.). In another approach, business value may be determined based on how valuable the particular topic is to the organization, thereby resulting in any connection related to the particular topic being of high business value.

In one or more embodiments, the computing device may determine that the business value meets or exceeds a threshold value. The business value may be normalized to a scale, such that the threshold may be set to ensure a certain amount of connections have a business value that meets the threshold value. The business value may be represented as a number that falls upon that scale. In an approach, the communication to generate the connection is transmitted responsive to determining that the business value meets the second threshold value. In other words, the communication is not transmitted, in this approach, when the business value does not meet the second threshold value.

In one approach, the computing device applies rules to the additional interaction to make one or more determinations. Some example determinations that the rule may make include, but are not limited to, determining whether the first member transmitted a message to the second member to begin collaboration on the particular topic, determining whether the second member replied to the message, determining whether the first member and the second member held an in-person meeting responsive to the message or the communication, determining a length of the in-person meeting (if applicable), determining a number and frequency of interactions associated with the particular topic between the first member and the second member subsequent to transmitting the message or the communication, and determining a length of each subsequent interaction associated with the particular topic. Each of these determinations, and others not specifically described herein, are indicative of the connection being successful in some way, either because the members are conducting ongoing communications about the particular topic, have set up meetings to discuss the particular topic, spend time together because of the particular topic, etc.

In one or more embodiments, method 300 may include identifying a second set of interactions, of a third member of the organization, with each of the interactions in the set being associated with the particular topic. The computing device applies rules to the second set of interactions to generate a second set of connection scores corresponding respectively to the set of connection factors. The connection scores are configured to aid in determining whether to connect the third member to the particular topic. The rules may behave similar to those described for previous interactions, such as performing keyword searches for a topic, examining a degree of connection between a member and a topic, etc. The computing device generates a second overall connection score for rating a connection between the third member and the particular topic. The second overall connection score is based, at least, on the set of weights (or the updated set of weights, if applicable) for adjusting the set of connection factors.

In some embodiments, the computing device may evaluate one or more combinations of collaborators for connecting to the first member in anticipation of collaboration on the particular topic. Each of the possible combinations of collaborators may be evaluated by the computing device to predict an outcome score for each combination. The outcome score may be calculated as described previously, and will predict whether a particular combination will be successful in furthering discussions regarding the particular topic between the different combinations of collaborators. Once an outcome score is computed for each combination, a particular combination of collaborators is selected, based on the predicted outcome score for the particular combination of collaborators. In these embodiments, the communication is transmitted to each collaborator in the particular combination of collaborators to initiate collaboration.

According to an embodiment, the computing device may identify a need for the second member to receive expert help on the particular topic. This determination may be based on words or phrases included in interactions of the second member, such as "help," "expert," "aid," "teach," etc., in relation to the particular topic. In this embodiment, the communication to generate the connection is transmitted responsive to identifying the need for the second member to receive expert help on the particular topic. In one approach, the first member may be an expert on the particular topic, and this status is what dictates connection of the first member with the second member.

In an embodiment, an escalation process may be included in method 300. In this process, should the communication be ignored or unresponded to by one or more members selected to receive the communication to connect members, the computing device may send out a reminder or alert regarding the proposed connection. In a further approach, this follow-up may be based on the importance or business value of the particular topic, and is not sent for minor or less important connections. Moreover, the reminder or alert may be sent to a most senior member in the connection.

In another embodiment, the communication may allow for one or more recipient members to manually add other members to connect regarding the particular topic. In this way, if a member knows of another member related to the particular topic, but this member has not been detected by the computing device, the connection may be expanded to include the newly-identified member manually. After this addition, all further correspondence will be forwarded to all members, including the newly-identified member.

In one or more embodiments, a non-transitory computer readable medium may store instructions, that when executed by a hardware processor, cause execution of one or more operations of method 300. According to one or more embodiments, a system may include the non-transitory computer readable medium and the hardware processor.

5. Example Embodiments

Detailed examples are described below for purposes of clarity. Components and/or operations described below should be understood as one specific example which may not be applicable to certain embodiments. Accordingly, components and/or operations described below should not be construed as limiting the scope of any of the claims.

5.1 Tables Showing Members Correlated with Topics

FIGS. 4A-4B are example tables showing correlations between members and topics, in accordance with one or more embodiments. A ML engine, or some other suitable component of a computing device, may learn different members of an organization and topics which are related to each member. These correlations may be stored in a data repository, with example tables being provided in FIGS. 4A-4B for Cutting Edge Technologies, discussed in an example previously.

FIG. 4A shows an example table that lists each member of Cutting Edge Technologies that the ML engine learned in correlation with topics that the ML engine learned through interactions of the members, member profiles, etc.

In this example table, Sarah Smith is correlated with the following topics: flying car, jet pack, levitation boots, Lake Tahoe, and magnetron. Darnell Reynolds is correlated with rocket engine, Lake Tahoe, flying car, and perpetual motion. Teresa Ortiz is correlated with magnetron, rocket engine, daycare, and efficient desalination. Sam Patel is correlated with levitation boots, flying car, and efficient desalination. Pat Sullivan is correlated with magnetron and Lake Tahoe.

Lake Tahoe may be disregarded as a topic relevant to Cutting Edge Technologies, in one example, based on a determination that no projects/tasks are related to this location, e.g., no facilities, installations, customers, or users of Cutting Edge Technologies are present in or around Lake Tahoe. Lake Tahoe may be a topic for Sarah Smith, Darnell Reynolds, and Pat Sullivan because it was the location each of these members planned a vacation for the winter. However, because a vacation is not business-related, it may be disregarded by the ML engine for forging connections between the members.

In another example, daycare may be disregarded as a topic relevant to Cutting Edge Technologies based on a determination that no current or past projects, products, or tasks have a business relationship with a daycare. Instead, this topic may have been learned due to Teresa Ortiz' multiple calls and emails with her child's daycare to deal with her child being sick, in an example. Therefore, this topic may be disregarded for forming connections between Teresa and other members of Cutting Edge Technologies.

FIG. 4B shows the learned topics correlated to each member associated with the topic. This layout is useful for determining which members are correlated with each topic. Using this information, the ML engine may propose connections between members who have common interest in a topic. For example, a suggested connection message may be delivered to Sam Patel, Darnell Reynolds, and Sarah Smith indicating that each member may be able to provide valuable information to one another regarding flying cars. In another example, Teresa Ortiz, Sarah Smith, and Pat Sullivan may be sent a message proposing a connection between each member to discuss a magnetron.

Once these connections are proposed and/or attempted, by sending a message to each member that includes details about why the members may benefit from connecting together for a particular topic, additional interactions between the members may be detected. From these additional interactions, it may be possible to determine if the connection was successful and/or merited, or if the connection was not helpful to one or more of the members to whom the connection was proposed. These additional interactions may be analyzed by the ML engine to determine positive and negative reactions to the connection.

Some examples of positive reactions include a determination that ongoing and/or future interactions will take place to discuss the particular topic, a determination that members have been added to a joint group directed to the particular topic, a determination that a member responded to past interactions with encouraging words or actions (e.g., "The meeting was very helpful," "Can we meet again to discuss [the particular topic]," "Let's write a paper together for [the particular topic]"), etc.

Some examples of negative reactions include a determination that no further interactions will take place to discuss the particular topic, a determination that a member has been removed from a joint group directed to the particular topic, a determination that a member responded to past interactions with encouraging words or actions (e.g., "The meeting was very helpful," "Can we meet again to discuss [the particular topic]," "Let's write a paper together for [the particular topic]"), etc.

Other forms of data retention than those shown in FIGS. 4A-4B may be used to store information collected from interactions and used by the ML engine and the ML model for proposed connections between members of the organization based on shared interest and/or expertise in a topic, in one or more embodiments. Moreover, further correlations may be learned and/or derived from the information collected from interactions between the members of the organization, in one or more embodiments.

5.2 Tables Showing Example Connection Factor Weights

FIGS. 5A-5C are example tables showing connection factor weights for example connection factors. In the descriptions of FIGS. 5A-5C, it is assumed that the formula to calculate the overall connection score is:

$$w_1 CF_1 + w_2 CF_2 + \ldots w_n CF_n = OCS,$$

where $CF_i$ is the ith connection factor, $w_i$ is a connection factor weight for the ith connection factor, a total of n connection factors are included in the calculation, and OCS is the overall connection score. Other calculations may be used to determine the overall connection factor in one or more embodiments, and connection factors are defaulted to 0 when no evidence of the connection factor is evident from the interactions.

FIG. 5A is a table showing example connection factor weights for different types of interactions. This table lists example interaction types and a connection factor weight assigned to each interaction type. This information may be used in calculating the overall connection score describing how connected a member is to a particular topic.

For example, one of the connection factors used to calculate the overall connection score may describe a type of interactions regarding the particular topic. The more types of interactions are detected, the greater this connection factor will influence the overall connection score in one approach.

In this example, if the member has only communicated via email to discuss the particular topic with another member, the connection factor weight is 0.2. The connection factor weight 0.2 may then be multiplied by the connection score for this interaction type indicating if the interaction related to the particular topic, typically 1 or 0. Likewise, if the member has held a one-to-one in-person meeting to discuss the particular topic, the connection factor weight is 0.6. Similarly, if the member is the sole author of a topic-specific paper on the particular topic, the connection factor weight is 1.0, the highest possible weight indicating a direct correlation between the member writing the paper and a connection to the particular topic. Conversely, a social media post mentioning the particular topic is not likely to indicate a strong correlation for the member to be connected to the particular topic (e.g., "I wish I had a flying car!"). Therefore, a social media post only has a connection factor weight of 0.1, resulting in the social media post providing a weak correlation for the member's connection to the particular topic.

The individual connection factor weights may be averaged together for a set of interaction types in one embodiment. In more embodiments, a mean weight may be selected, a median weight may be selected, and/or a highest score may be selected to represent the member's connection to the particular topic.

In the example used for FIG. 5A, connection factor weights are used to describe the relative likelihood that a certain type of interaction correlates to a connection between the member and the particular topic. More, less, and/or different interaction types may be considered in such a scheme, along with different weights associated with each interaction type, in various approaches.

FIG. 5B is a table showing example connection factor weights for different ranges of relevancy of interactions. This table lists example ranges of relevancy and a connection factor weight assigned to each relevancy range. In other words, the weights in this table are used to enhance the effect that more recent interactions have on the overall connection score. Conversely, the weights in this table are also used to decrease the effect that less recent interactions have on the overall connection score. This information may be used in calculating the overall connection score describing how connected a member is to a particular topic.

In this example, one of the connection factors used to calculate the overall connection score describes how recent an interaction regarding the particular topic is, regardless of what type of interaction is being considered. If the member has an interaction regarding the particular topic in the last day, the connection factor weight for this interaction will be 1.0. If the member has interacted to discuss the particular topic more than a week ago, but less than a month ago, the connection factor weight will equal 0.6. Likewise, if the member last interacted on the particular topic more than a year ago, the connection factor score will equal 0.2. These example connection factor weights indicate a decaying relationship between length of time for the interaction and how strong the correlation is to establishing a connection between the member the particular topic.

In this example, connection factor weights are used to describe the relative likelihood that an age of the interaction indicates a connection between the member and the particular topic. More, less, and/or different relevancy ranges may be considered in such a scheme, along with different weights associated with each relevancy range, in various approaches.

FIG. 5C is a table showing example connection factor weights for different connection factors. This table lists example connection factors and a connection factor weight assigned to each connection factor. In other words, the weights in this table are used to enhance the effect that certain connection factors have on the overall connection score. Conversely, the weights in this table are also used to decrease the effect that other connection factors have on the overall connection score.

In this example, the connection factors used to calculate the overall connection score include expertise, relevancy, experience, group participation, and frequency of interactions. A member who has demonstrated expertise in a particular topic is most likely to be connected to the particular topic, and therefore the connection factor will be weighted fully (e.g., as 1.0). The relevancy of interactions regarding the particular topic also demonstrates a strong correlation for the member being connected to the particular topic, and therefore in this example has a weight of 0.8. Having received training or having experience in a particular topic does not present as strong of a correlation for the member being connected to the particular topic, and therefore in this example has a weight of 0.4. The remaining connection factors, participation in a topic-specific group and how frequently the member has interactions about the particular topic also provide weaker correlations for the member being connected to the particular topic, and therefore in this example have weights of 0.3 and 0.2, respectively.

In some examples, the ML engine may learn that frequency is a greater indicator of a connection between the member and the particular topic. In one example, the weight for the frequency connection factor may be increased as a result of this training, e.g., from 0.2 to 0.6. Conversely, the ML engine may learn that relevancy is a weaker indicator of a connection between the member and the particular topic. In an example, the weight for the relevancy connection factor may be reduced as a result of this training, e.g., from 0.8 to 0.4.

In this example, connection factor weights are used to describe the relative likelihood that a certain connection factor indicates a connection between the member and the particular topic. More, less, and/or different connection factors may be considered in such a scheme, along with different weights associated with each connection factor, in various approaches.

6. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a NAT. Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources.

Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

7. Hardware Overview

According to one embodiment, the techniques described herein are implemented by one or more special-purpose computing devices (i.e., computing devices specially configured to perform certain functionality). The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or solid state disk, is provided and coupled to bus 602 for storing information and instructions.

Computer system 600 may be coupled via bus 602 to a display 612, such as a liquid crystal display (LCD), plasma display, electronic ink display, cathode ray tube (CRT) monitor, or any other kind of device for displaying information to a computer user. An input device 614, including alphanumeric and other keys, may be coupled to bus 602 for communicating information and command selections to processor 604. Alternatively or in addition, the computer system 600 may receive user input via a cursor control 616, such as a mouse, a trackball, a trackpad, a touchscreen, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane. The display 612 may be configured to receive user input via one or more pressure-sensitive sensors, multi-touch sensors, and/or gesture sensors. Alternatively or in addition, the computer system 600 may receive user input via a microphone, video camera, and/or some other kind of user input device (not shown).

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, solid-state or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a programmable read-only memory (PROM), and erasable PROM (EPROM), a FLASH-EPROM, non-volatile random-access memory (NVRAM), any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a network, via a network interface controller (NIC), such as an Ethernet controller or Wi-Fi controller. A NIC local to computer system 600 can receive the data from the network and place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618. The received code may be executed by processor 604 as it is received, and/or stored in storage device 610, or other non-volatile storage for later execution.

8. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, causes performance of operations comprising:
    obtaining sets of training data, the sets of training data including a particular set of training data comprising:
        a particular set of one or more interactions; and
        a label comprising at least one of:
            an interaction type corresponding to the particular set of one or more interactions;
            a topic corresponding to the particular set of one or more interactions; or
            an identification of one or more members of an organization that are involved in the particular set of one or more interactions;
    training a machine learning model based on the sets of training data to yield a trained machine learning model; and
    applying the trained machine learning model to observed data comprising a target set of one or more interactions, to determine a prediction comprising at least one of: (a) a first interaction type corresponding to the target set of one or more interactions, (b) a first topic corresponding to the target set of one or more interactions, or (c) a first member, of an organization, involved in the target set of one or more interactions;
    computing a connection score between the first member and the first topic based on a set of different types of interactions by the first member involving the first topic, wherein computing the connection score includes applying a set of weights to the set of different types of interactions;
    obtaining feedback regarding the first member, the feedback indicating whether the first member is knowledgeable, helpful, or otherwise useful to one or more other members on matters related to the first topic; and
    adjusting the set of weights assigned to the set of different types of interactions based on the feedback, wherein adjusting the set of weights includes increasing one or more weights, of the set of weights, associated with one or more interaction types, of the set of different types of interactions, that correlate with positive feedback.

2. The non-transitory computer readable medium as recited in claim 1,
    wherein the label, in the particular set of training data, comprises the interaction type corresponding to the particular set of one or more interactions, and
    wherein applying the trained machine learning model determines the first interaction type corresponding to the target set of one or more interactions.

3. The non-transitory computer readable medium as recited in claim 1,
    wherein the label, in the particular set of training data, comprises the topic corresponding to the particular set of one or more interactions, and
    wherein applying the trained machine learning model determines the first topic corresponding to the target set of one or more interactions.

4. The non-transitory computer readable medium as recited in claim 1,
    wherein the label, in the particular set of training data, comprises the identification of the one or more members of the organization that are involved in the particular set of one or more interactions, and
    wherein applying the trained machine learning model determines the first member, of the organization, involved in the target set of one or more interactions.

5. The non-transitory computer readable medium as recited in claim 1, wherein the trained machine learning model comprises the set of weights, and wherein the adjusting the set of weights associated with the set of different types of interactions based on the feedback is based on training the trained machine learning model based on the feedback.

6. The non-transitory computer readable medium as recited in claim 1, wherein the operations further comprise training the machine learning model to recognize non-relevant topics and disregard interactions that include non-relevant topics.

7. The non-transitory computer readable medium as recited in claim 1, wherein the operations further comprise obtaining the observed data by monitoring interactions of members of the organization.

8. A system comprising:
    one or more hardware processors; and
    a non-transitory computer readable medium comprising instructions which, when executed by the one or more hardware processors, causes performance of operations comprising:
        obtaining sets of training data, the sets of training data including a particular set of training data comprising:
            a particular set of one or more interactions; and
            a label comprising at least one of:
                an interaction type corresponding to the particular set of one or more interactions;
                a topic corresponding to the particular set of one or more interactions; or
                an identification of one or more members of an organization that are involved in the particular set of one or more interactions;
        training a machine learning model based on the sets of training data to yield a trained machine learning model;
        applying the trained machine learning model to observed data comprising a target set of one or more interactions, to determine a prediction comprising at least one of: (a) a first interaction type corresponding to the target set of one or more interactions, (b) a first topic corresponding to the target set of one or more interactions, or (c) a first member, of an organization, involved in the target set of one or more interactions;

computing a connection score between the first member and the first topic based on a set of different types of interactions by the first member involving the first topic, wherein computing the connection score includes applying a set of weights to the set of different types of interactions;

obtaining feedback regarding the first member, the feedback indicating whether the first member is knowledgeable, helpful, or otherwise useful to one or more other members on matters related to the first topic; and adjusting the set of weights associated with the set of different types of interactions based on the feedback, and wherein adjusting the set of weights includes increasing one or more weights, of the set of weights, associated with one or more interaction types, of the set of different types of interactions, that correlate with positive feedback.

9. The system as recited in claim 8, wherein the label, in the particular set of training data, comprises the interaction type corresponding to the particular set of one or more interactions, and wherein applying the trained machine learning model determines the first interaction type corresponding to the target set of one or more interactions.

10. The system as recited in claim 8, wherein the label, in the particular set of training data, comprises the topic corresponding to the particular set of one or more interactions, and wherein applying the trained machine learning model determines the first topic corresponding to the target set of one or more interactions.

11. The system as recited in claim 8, wherein the label, in the particular set of training data, comprises the identification of the one or more members of the organization that are involved in the particular set of one or more interactions, and wherein applying the trained machine learning model determines the first member, of the organization, involved in the target set of one or more interactions.

12. The system as recited in claim 8, wherein the trained machine learning model comprises the set of weights, and wherein the adjusting the set of weights associated with the set of different types of interactions based on the feedback is based on training the trained machine learning model based on the feedback.

13. The system as recited in claim 8, wherein the operations further comprise training the machine learning model to recognize non-relevant topics and disregard interactions that include non-relevant topics.

14. The system as recited in claim 8, wherein the operations further comprise obtaining the observed data by monitoring interactions of members of the organization.

15. A method performed by one or more digital devices comprising one or more hardware processors, the method comprising:

obtaining sets of training data, the sets of training data including a particular set of training data comprising:

a particular set of one or more interactions; and a label comprising at least one of:

an interaction type corresponding to the particular set of one or more interactions;

a topic corresponding to the particular set of one or more interactions; or an identification of one or more members of an organization that are involved in the particular set of one or more interactions;

training a machine learning model based on the sets of training data to yield a trained machine learning model; and applying the trained machine learning model to observed data comprising a target set of one or more interactions, to determine a prediction comprising at least one of: (a) a first interaction type corresponding to the target set of one or more interactions, (b) a first topic corresponding to the target set of one or more interactions, or (c) a first member, of an organization, involved in the target set of one or more interactions;

computing a connection score between the first member and the first topic based on a set of different types of interactions by the first member involving the first topic, wherein computing the connection score includes applying a set of weights to the set of different types of interactions;

obtaining feedback regarding the first member, the feedback indicating whether the first member is knowledgeable, helpful, or otherwise useful to one or more other members on matters related to the first topic; and adjusting the set of weights associated with the set of different types of interactions based on the feedback, and wherein adjusting the set of weights includes increasing one or more weights, of the set of weights, associated with one or more interaction types, of the set of different types of interactions, that correlate with positive feedback.

16. The method as recited in claim 15, wherein the label, in the particular set of training data, comprises the interaction type corresponding to the particular set of one or more interactions, and wherein applying the trained machine learning model determines the first interaction type corresponding to the target set of one or more interactions.

17. The method as recited in claim 15, wherein the label, in the particular set of training data, comprises the topic corresponding to the particular set of one or more interactions, and wherein applying the trained machine learning model determines the first topic corresponding to the target set of one or more interactions.

18. The method as recited in claim 15, wherein the label, in the particular set of training data, comprises the identification of the one or more members of the organization that are involved in the particular set of one or more interactions, and wherein applying the trained machine learning model determines the first member, of the organization, involved in the target set of one or more interactions.

19. The method as recited in claim 15, wherein the trained machine learning model comprises the set of weights, and wherein the adjusting the set of weights associated with the set of different types of interactions based on the feedback is based on training the trained machine learning model based on the feedback.

20. The method as recited in claim 15, wherein the operations further comprise training the machine learning model to recognize non-relevant topics and disregard interactions that include non-relevant topics.

* * * * *